US011381344B2

(12) United States Patent
Blankenship et al.

(10) Patent No.: US 11,381,344 B2
(45) Date of Patent: Jul. 5, 2022

(54) REORDERING OF CODE BLOCKS FOR HARQ RETRANSMISSION IN NEW RADIO

(71) Applicant: Telefonaktiebolaget LM Ericsson (publ), Stockholm (SE)

(72) Inventors: Yufei Blankenship, Kildeer, IL (US); Mattias Andersson, Sundbyberg (SE); Sara Sandberg, Luleå (SE); Amirpasha Shirazinia, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 95 days.

(21) Appl. No.: 16/646,375

(22) PCT Filed: Sep. 13, 2018

(86) PCT No.: PCT/IB2018/057016
§ 371 (c)(1),
(2) Date: Mar. 11, 2020

(87) PCT Pub. No.: WO2019/053631
PCT Pub. Date: Mar. 21, 2019

(65) Prior Publication Data
US 2020/0274645 A1 Aug. 27, 2020

Related U.S. Application Data

(60) Provisional application No. 62/559,441, filed on Sep. 15, 2017.

(51) Int. Cl.
*H04L 1/08* (2006.01)
*H04W 76/28* (2018.01)
(Continued)

(52) U.S. Cl.
CPC .............. *H04L 1/08* (2013.01); *H04L 1/0057* (2013.01); *H04L 1/0071* (2013.01);
(Continued)

(58) Field of Classification Search
CPC ..... H04L 1/00; H04L 1/08; H04L 1/67; H04L 5/0053; H04L 5/0055; H04L 5/0056;
(Continued)

(56) References Cited

U.S. PATENT DOCUMENTS 4,344,171 A * 8/1982 Lin ..................... H04B 7/18513
714/751
6,126,310 A * 10/2000 Osthoff ................. H04L 1/0071
714/751
(Continued)

FOREIGN PATENT DOCUMENTS

GB      2562097     * 5/2017  ............... H04L 1/16
WO   2009 088226 A2   7/2009

OTHER PUBLICATIONS

PCT International Search Report for International application No. PCT/IB2018/057016—dated Dec. 17, 2018.
(Continued)

*Primary Examiner* — Warner Wong
(74) *Attorney, Agent, or Firm* — Sage Patent Group

(57) ABSTRACT

According to certain embodiments, a wireless transmitter comprises a wireless interface and processing circuitry communicatively coupled to the wireless interface. The processing circuitry is operable to send, via the wireless interface, a transmission comprising a plurality of code blocks and a retransmission comprising at least some of the code blocks
(Continued)

of the transmission. To send the retransmission, the processing circuitry rearranges the order of the code blocks such that the order of the code blocks in the retransmission differs from the order of the code blocks in the transmission.

16 Claims, 12 Drawing Sheets

(51) Int. Cl.
*H04L 1/00* (2006.01)
*H04L 1/18* (2006.01)
*H04L 5/00* (2006.01)
*H04L 41/0654* (2022.01)
*H04B 7/185* (2006.01)

(52) U.S. Cl.
CPC .......... *H04L 1/1867* (2013.01); *H04L 5/0055* (2013.01); *H04L 41/0654* (2013.01); *H04W 76/28* (2018.02); *H04B 7/18543* (2013.01); *H04L 1/0006* (2013.01); *H04L 1/1825* (2013.01); *H04L 1/1841* (2013.01)

(58) Field of Classification Search
CPC ... H04L 5/0057; H04L 41/06; H04L 41/0654; H04L 1/0056; H04L 1/0071; H04L 1/001; H04L 1/0006; H04L 1/1809; H04L 1/1816; H04L 1/1819; H04L 1/1825; H04L 1/1841; H04L 1/1874; H04L 1/187; H04L 1/18–1896; H04W 76/20; H04W 76/28; H04B 7/18543

See application file for complete search history.

(56) References Cited

U.S. PATENT DOCUMENTS

| | | | |
|---|---|---|---|
| 2005/0097424 A1* | 5/2005 | Golitschek | H04L 1/1867 714/749 |
| 2005/0254463 A1* | 11/2005 | Suzuki | H04L 1/1819 370/335 |
| 2006/0251185 A1* | 11/2006 | Von Elbwart | H04L 1/1819 375/298 |
| 2009/0063924 A1* | 3/2009 | Golitschek Edler Von Elbwart | H04L 1/1893 714/748 |
| 2009/0313516 A1* | 12/2009 | Shin | H04L 1/0009 714/748 |
| 2010/0284490 A1* | 11/2010 | Kim | H04L 1/1819 375/298 |
| 2015/0067435 A1 | 3/2015 | Yerramalli et al. | |
| 2019/0074937 A1* | 3/2019 | Bhattad | H04L 1/1896 |
| 2019/0356420 A1* | 11/2019 | John Wilson | H04L 1/0068 |
| 2019/0379489 A1* | 12/2019 | Hwang | H04L 1/1819 |
| 2020/0106560 A1* | 4/2020 | Cheng | H04L 1/1864 |
| 2020/0169357 A1* | 5/2020 | Lei | H04L 1/0073 |
| 2020/0366411 A1* | 11/2020 | Xu | H04L 1/1812 |
| 2021/0168836 A1* | 6/2021 | Takeda | H04W 72/1263 |

OTHER PUBLICATIONS

PCT Written Opinion of the International Searching Authority for International application No. PCT/IB2018/057016—dated Dec. 17, 2018.
3GPP TSG RAN WG1 Meeting #50; Athens, Greece; Source: Samsung; Title: Code block reordering in HARQ retransmissions (R1-073579)—Aug. 20-24, 2007.

* cited by examiner

1202 — Receiving at least some code blocks of a transmission that comprises a plurality of code blocks.

1204 — Determining that the wireless receiver has failed to successfully receive at least some code blocks of the transmission.

1206 — Sending a signal to the wireless transmitter indicating to retransmit at least the code blocks that the wireless receiver failed to successfully receive.

1208 — Receiving at least some code blocks of a retransmission that comprises one or more of the code blocks of the transmission arranged in an order that differs from the order of the code blocks in the transmission.

1210 — Deinterleaving the code blocks received in the retransmission.

1212 — Combining one or more of the code blocks received in the transmission with one or more of the code blocks received in the retransmission.

1214 — Decoding the combined code blocks.

*FIG. 12*

REORDERING OF CODE BLOCKS FOR HARQ RETRANSMISSION IN NEW RADIO

PRIORITY

This nonprovisional application is a U.S. National Stage Filing under 35 U.S.C. § 371 of International Patent Application Serial No. PCT/IB2018/057016 filed Sep. 13, 2018 and entitled "*Reordering of Code Blocks for HARQ Retransmission in New Radio*" which claims priority to U.S. Provisional Patent Application No. 62/559,441 filed Sep. 15, 2017 both of which are hereby incorporated by reference in their entirety.

TECHNICAL FIELD

Certain embodiments of the present disclosure relate, in general, to wireless communications and, more specifically, to reordering of code blocks for New Radio (NR) Hybrid Automatic Repeat Request (HARQ). Certain embodiments may generally relate to Low-density parity-check (LDPC) codes, redundancy version, HARQ, and retransmission.

BACKGROUND

New Radio Low-Density Parity-Check Codes

The NR LDPC codes belongs to a family of rate-compatible LDPC codes based on protographs. They are also quasi-cyclic. Quasi-cyclic parity-check matrices are partitioned into square sub-blocks (sub-matrices) of size Z×Z. These submatrices are either cyclic-permutations of the identity matrix or null submatrices. The cyclic-permutation matrix Pi is obtained from the Z×Z identity matrix by cyclically shifting the columns to the right by i elements. The matrix P0 is the Z×Z identity matrix. Quasi-cyclic LDPC codes are conveniently described through a base matrix, which is a matrix where each integer i denotes the cyclic-permutation matrix Pi. Entries with i=−1 in the matrix denote null (zero) submatrices.

The basic structure of the parity check matrix (PCM) H is illustrated in FIG. 1. The figure shows the case where the first 2×Z systematic bits are always punctured (the set of bits corresponding to the shaded columns labeled with reference numeral 10 in FIG. 1), a structure that has been shown to reduce the threshold of the code. Some of the remaining systematic bits are always transmitted, while some of them may be shortened if an information block length $K_{tx}$, with $K_{tx}<K$ is desired, where K is the native information block length of the parity check matrix (PCM). The first $M_b \times Z$ parity bits, as well as the bits corresponding to one to three degree one columns (the set of bits corresponding to the parity bit columns labeled with reference numeral 12 and a few of the parity bit columns labeled with reference numeral 14 illustrated in FIG. 1), gives the highest rate code. The rate may be reduced by transmitting additional parity bits from the incremental redundancy part, as described by the rightmost part of the matrix. In case of shortening, or a desired code rate higher than the highest design rate, some of the parity bits can be punctured.

There are two sets of LDPC codes defined for NR. One is designed for code rates from ~8/9 to 1/3 and block lengths up to 8448 (base graph #1, also called BG #1), and the other is defined for code rates from ~2/3 to 1/5 and block lengths up to 3840 (base graph #2 or BG #2). When these LDPC codes are used with lower rates than designed for, repetition and chase combining is used to achieve a lower code rate.

Hybrid Automatic Repeat Request Retransmissions

In many wireless communications systems, HARQ (Hybrid Automatic Repeat Request) re-transmissions are used to handle unpredictable interference and channel variations. The retransmissions may be sent in response to feedback messages that the receiver uses to inform the transmitter whether a transmission was successful or not. Examples of feedback messages include acknowledgement (ACK) and negative acknowledgement (NACK) messages. The transmitter may determine to send a retransmission based on not receiving ACK messages within an expected timeframe or based on receiving NACK messages. An important part of the LTE HARQ is the use of soft combining, which implies that the receiver combines the received signal from multiple transmission attempts. When using soft combining, the erroneously received packet is stored in a buffer memory and is later combined with one or several retransmissions. The decoder is operating on the combined soft buffer, thereby producing a more reliable output than if only a single transmission would have been used.

HARQ with soft combining is typically based on incremental redundancy (IR), which includes Chase combining (CC) as a special case. With IR, each retransmission may be different to the previous transmission, but all retransmissions represent the same information bits. Whenever a retransmission is needed, the retransmission typically uses a different set of coded bits than the previous transmission. The receiver combines the soft information of the first transmission with the soft information of the retransmission. If exactly the same coded bits are used for the first transmission and the retransmission, i.e., Chase combining, the combined soft information corresponds to a codeword with the same length as the first transmission. If any bits that were not part of the first transmission are included in the retransmission, the combined soft information corresponds to a longer codeword with lower code rate. In LTE, the (re) transmissions and IR is based on a circular buffer together with different redundancy versions (RV). The LTE turbo code is a systematic code of rate 1/3, i.e., 1/3 of the coded bits are systematic bits, or information bits, and 2/3 of the bits are parity bits. A codeword, after sub-block interleaving, $[s_0, s_1, \ldots, s_{k-1}, p_0^1, p_0^2, \ldots, p_{k-1}^1, p_{k-1}^2]$ is put into a circular buffer. Each RV indicates a starting point in the circular buffer. To generate n bits of redundancy version T, n bits are read clock-wise from the circular buffer, starting at the position indicated by RV T and wrapping around to $s_o$ if the end of the codeword is reached. The number of bits n to be transmitted can be determined from the scheduling information. An example schematic of an LTE circular buffer for rate matching is illustrated in FIG. 2.

If the RV index is not explicitly signalled, an implicit RV order is used. For LTE, uplink transmissions often lack explicit RV signalling and the following redundancy versions are used for the first four transmissions.

| Transmission | $rv_{idx}$ |
|---|---|
| 0 | 0 |
| 1 | 2 |
| 2 | 3 |
| 3 | 1 |

The HARQ retransmissions for NR LDPC codes will work in a similar way as in LTE and is based on a circular buffer.

Code Block Groups (CBG)

It has been decided in the third generation partnership project (3GPP) that CBG-based transmission with single/multi-bit HARQ-ACK feedback is supported in Rel-15. The CBG-based transmission only allow CBG-based (re)-transmission for the same transport block (TB) of a HARQ process. A CBG can include all code blocks (CBs) of a TB regardless of the size of the TB. In such case, the UE reports a single HARQ ACK bit for the TB. However, a CBG can also include only one CB. Furthermore, it has been decided that the CBG granularity should be configurable.

The configurable number of HARQ feedback bits should give CBG-specific feedback on which CBGs were received successfully and which were not. This requires one HARQ feedback bit per CBG.

In case of a HARQ retransmission, only the CBs belonging to CBGs for which NACK/DTX was received are retransmitted.

Maximum Number of CBs in a TB

There may be a maximum number of code blocks in a transport block. The maximum number of code blocks may be related to the maximum number of physical resource blocks (PRBs) per component carrier. For NR, max=275 PRBs per component carrier. The table below provides an example of the maximum number of CBs in a TB under the following assumptions:

1 275 PRB=3300 subcarriers, no RE used for RS within the OFDM symbols assigned to data tx; code rate 8/9, 4 MIMO layers, 256-QAM N_RE_per_PRB=N_ofdm_symbol*12
N_coded_bits=N_RE_per_PRB*N_PRB*N_layers*
    QAM=N_RE_per_PRB*275*4*8
N_CB=ceil(N_coded_bits/8448*8/9)

| #PRBs | N_ofdm_symbol | N_RE_per_PRB | N_coded_bits | N_CB |
|---|---|---|---|---|
| 275 | 12 | 144 | 1267200 | 134 |
| 275 | 13 | 156 | 1372800 | 145 |

SUMMARY

Certain embodiments of the present disclosure may provide solutions to one or more of the following problems:

For NR, several factors may cause a code block to be prone to failure even when HARQ retransmission is sent. This happens when modulation symbols of a given CB consistently experience deep fade-like channel condition in repeated transmission of the same CB.

In one scenario, the modulation symbols of the CB are located at a frequency location that experiences deep fading channel condition, and its retransmission is put on the same frequency location. With very wide bandwidth and high order modulation and/or high spatial multiplexing, a CB occupies a very small fraction in the frequency domain. The CB can be trapped in a fading dip. Assuming same/similar allocation sizes, transmitting a new RV does not address the problem because all bits from all RVs are all in the same dip.

In another scenario, due to the UE reception filtering, the code blocks mapped to the edges in frequency will have degraded performance, as if there is constant fading at the frequency edges. This is particularly obvious when UE is requested to achieve the maximum downlink (DL) data rate, which is associated with high code rate, high modulation order, and high number of multiple-input multiple-output (MIMO) layers.

In yet another scenario, UE experiences the problem of transient times, during which the signal quality is degraded. Power amplifiers (PAs) cannot change their power levels infinitely fast (e.g., PAs cannot change from one power level to another or switch on/off infinitely fast). Instead of an intermediate power level switch, the output power of the PAs gradually approaches the target power level. The majority of this power change happens within a so-called transient time. The gradient of power changes is typically not specified and cannot be easily determined by the receiver. Furthermore, the phase of the output signal may change during the transient time. A similar problem can occur if the frequency allocation changes, for example, due to changes to the total allocated bandwidth or changes to the location of the allocated bandwidth. Consider frequency hopping, for example. If the hopping happens within the configured UE bandwidth, the transient time is probably short but can still be larger than zero if, for example, the UE needs to switch filter and/or needs to reduce power to fulfill out-of-band-emission after the frequency-hop. If the frequency-hopping is done outside the UE configured bandwidth the UE needs to retune its local oscillator which also results in a typically longer transient time.

Certain embodiments of the present disclosure may provide solutions to the problem of repeated failure of a CB. For example, certain embodiments of the present disclosure provide solutions based on interleaving of code blocks.

According to certain embodiments, a method is disclosed for use in a wireless transmitter. The method comprises sending a transmission comprising a plurality of code blocks and sending a retransmission that comprises at least some of the code blocks of the transmission. Sending the retransmission comprises rearranging the order of the code blocks such that the order of the code blocks in the retransmission differs from the order of the code blocks in the transmission.

According to certain embodiments, a wireless transmitter comprises a wireless interface and processing circuitry communicatively coupled to the wireless interface. The processing circuitry is operable to send, via the wireless interface, a transmission comprising a plurality of code blocks and a retransmission comprising at least some of the code blocks of the transmission. To send the retransmission, the processing circuitry rearranges the order of the code blocks such that the order of the code blocks in the retransmission differs from the order of the code blocks in the transmission.

According to certain embodiments, a computer program product comprises a non-transitory computer readable medium storing computer readable program code. The computer readable program code comprises program code for sending a transmission comprising a plurality of code blocks and program code for sending a retransmission comprising at least some of the code blocks of the transmission. Sending the retransmission comprises rearranging the order of the code blocks such that the order of the code blocks in the retransmission differs from the order of the code blocks in the transmission.

The method, wireless transmitter, and/or computer program product may include one or more of the following features:

In some embodiments, the method/wireless transmitter/computer program detects a NACK/DTX indicating that a wireless receiver failed to successfully receive one or more of the code blocks. In response to detecting the NACK/

DTX, the method/wireless transmitter/computer program determines to send the retransmission. In some embodiments, each code block included in the retransmission corresponds to a respective one of the code blocks indicated by the NACK/DTX. In other embodiments, the retransmission comprises one or more code block groups and each code block group in the retransmission includes at least one of the code blocks indicated by the NACK/DTX. In other embodiments, the retransmission comprises all of the code block groups that were sent in the transmission.

In some embodiments, the method/wireless transmitter/computer program receives a signal from a wireless receiver. The signal indicates to retransmit at least some of the code blocks of the transmission. In response to receiving the signal, the method/wireless transmitter/computer program determines to send the retransmission. In some embodiments, each code block included in the retransmission corresponds to a respective one of code blocks that the wireless receiver failed to successfully receive in the transmission. In other embodiments, the retransmission comprises one or more code block groups and each code block group in the retransmission includes at least one of the code blocks that the wireless receiver failed to successfully receive in the transmission. In other embodiments, the retransmission comprises all of the code blocks that were sent in the transmission.

In some embodiments, rearranging the order of the code blocks comprises circularly selecting the code blocks to transmit without interleaving. For example, the code blocks are grouped according to code block groups and the circular selection is performed based on the code block groups.

In some embodiments, rearranging the order of the code blocks comprises interleaving the code blocks. For example, the code blocks are grouped according to code block groups and the interleaving is performed based on the code block groups.

In some embodiments, the wireless transmitter is configured according to NR protocol.

According to certain embodiments, a method for use in a wireless receiver comprises receiving at least some code blocks of a transmission that comprises a plurality of code blocks and receiving at least some code blocks of a retransmission that comprises one or more of the code blocks of the transmission arranged in an order that differs from the order of the code blocks in the transmission. The method further comprises combining one or more of the code blocks received in the transmission with one or more of the code blocks received in the retransmission.

According to certain embodiments, a wireless receiver comprises a wireless interface and processing circuitry communicatively coupled to the wireless interface. The processing circuitry is operable to receive, via the wireless interface, at least some code blocks of a transmission that comprises a plurality of code blocks and at least some code blocks of a retransmission that comprises one or more of the code blocks of the transmission arranged in an order that differs from the order of the code blocks in the transmission. The processing circuitry is operable to combine one or more of the code blocks received in the transmission with one or more of the code blocks received in the retransmission.

According to certain embodiments, a computer program product comprises a non-transitory computer readable medium storing computer readable program code. The computer readable program code comprises program code for receiving at least some code blocks of a transmission that comprises a plurality of code blocks, program code for receiving at least some code blocks of a retransmission that comprises one or more of the code blocks of the transmission arranged in an order that differs from the order of the code blocks in the transmission, and program code for combining one or more of the code blocks received in the transmission with one or more of the code blocks received in the retransmission.

The method, wireless receiver, and/or computer program product may include one or more of the following features:

In some embodiments, to enable combining of the one or more of the code blocks received in the transmission with the one or more of the code blocks received in the retransmission, the one or more of the code blocks received in the retransmission are deinterleaved.

In some embodiments, the combined code blocks are decoded.

In some embodiments, in response to determining that the wireless receiver has failed to successfully receive at least some code blocks of the transmission, a signal is sent to the wireless transmitter indicating to retransmit at least the code blocks that the wireless receiver failed to successfully receive.

In some embodiments, each code block included in the retransmission corresponds to a respective one of code blocks that the wireless receiver failed to successfully receive in the transmission.

In some embodiments, the retransmission comprises one or more code block groups and each code block group in the retransmission includes at least one of the code blocks that the wireless receiver failed to successfully receive in the transmission.

In some embodiments, the retransmission comprises all of the code blocks that were sent in the transmission.

In some embodiments, each code block included in the retransmission corresponds to a respective code block of the transmission for which the wireless transmitter detected a NACK or DTX. A code block of the transmission for which the wireless transmitter detected a NACK or DTX may be referred to as a NACK/DTX code block.

In some embodiments, the retransmission comprises one or more code block groups, each code block group comprising at least one code block that corresponds to a NACK/DTX code block of the transmission.

In some embodiments, the code blocks received in the retransmission are arranged according to a circular selection without interleaving.

In some embodiments, the code blocks are grouped according to code block groups and the code blocks received in the retransmission are arranged according to a circular selection based on the code block groups.

In some embodiments, the code blocks received in the retransmission are arranged with interleaving.

In some embodiments, the code blocks are grouped according to code block groups and the interleaving is according to the code block groups.

In some embodiments, the wireless receiver is configured according to NR protocol. Certain embodiments of the present disclosure may provide one or more technical advantages. As an example, by reordering the code blocks of a TB in retransmissions, the diversity effect is achieved between the HARQ (re-)transmissions of a CB. The diversity ensures that a CB will not be trapped in a fading dip. As another example, reordering in units of code blocks also has the benefit that decoding of each code block can start right away without waiting for all code blocks to be received. This keeps the decoding latency low for a TB. Low decoding latency is an important metric for NR data channel. Certain embodiments may have none, some, or all of these advantages. Other advantages may be understood by those of skill in the art.

BRIEF DESCRIPTION

FIG. 12 is a flow chart illustrating an example of a method that may be performed by a wireless receiver, in accordance with certain embodiments.

DETAILED DESCRIPTION

According to certain embodiments, a wireless transmitter sends transmissions to a wireless receiver. Each transmission may include code blocks. In certain situations, the wireless receiver may fail to successfully receive one or more of the code blocks. For example, the wireless receiver may fail to successfully receive one or more of the code blocks due to fading channel conditions. The wireless transmitter may determine that the wireless device failed to successfully receive one or more of the code blocks based on detecting a NACK or DTX. In response to detecting the NACK or DTX, the wireless transmitter may send a retransmission comprising at least some of the code blocks. The code blocks may be rearranged such that the order of the code blocks in the retransmission differs from the order of the code blocks in the transmission. Certain embodiments provide solutions based on interleaving of code blocks, as further discussed below.

CBG as Interleaving Unit; Circularly Select the CBs to Transmit Without Interleaving In one method, the interleaving unit is a whole CB. The CB indices are lined up sequentially in natural order, without being interleaved. The code blocks of a given TB are lined up in a circle. For each j-th transmission, the transmission starts with a potentially different CB index, N(j)-th CB. The TB is thus transmitted in the order of:

$$[N(j), N(j)+1, \ldots, N-1, 0, 1, \ldots, N(j)-1] \quad (1)$$

That is, starting at one point in the circle, step through the CB indices sequentially in the circle, and eventually wrap around to the starting point.

In one example, the index of the N(j)-th CB is calculated as $$N(j) = \text{mod}(\text{ceil}((N/J)*j), N), \quad (2)$$

where N is the total number of CBs in the TB, J is total number of possible starting points of CB indices.

Figure 1:
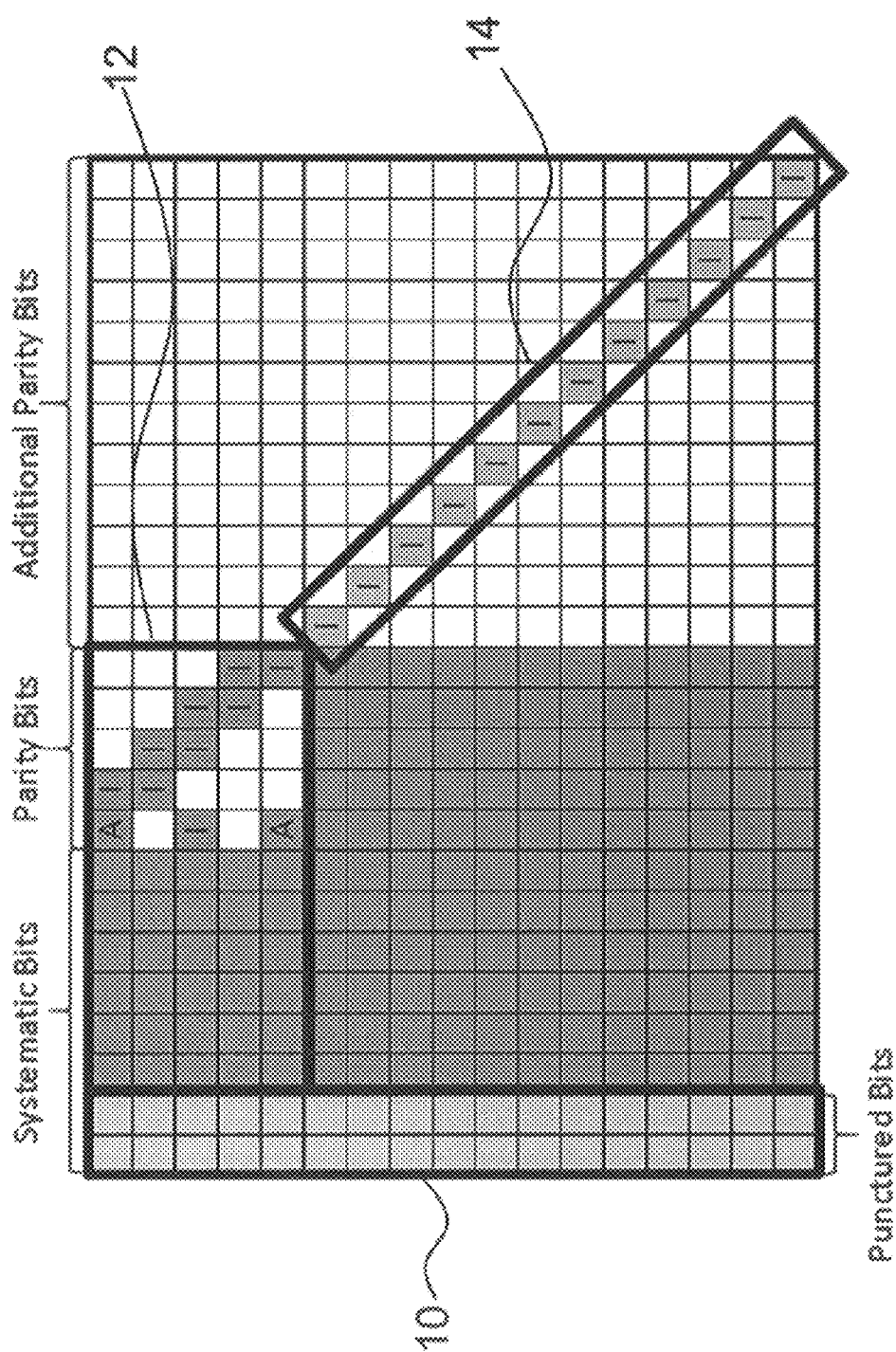
FIG. 1 illustrates an example of the basic structure of a parity check matrix.
Figure 2:
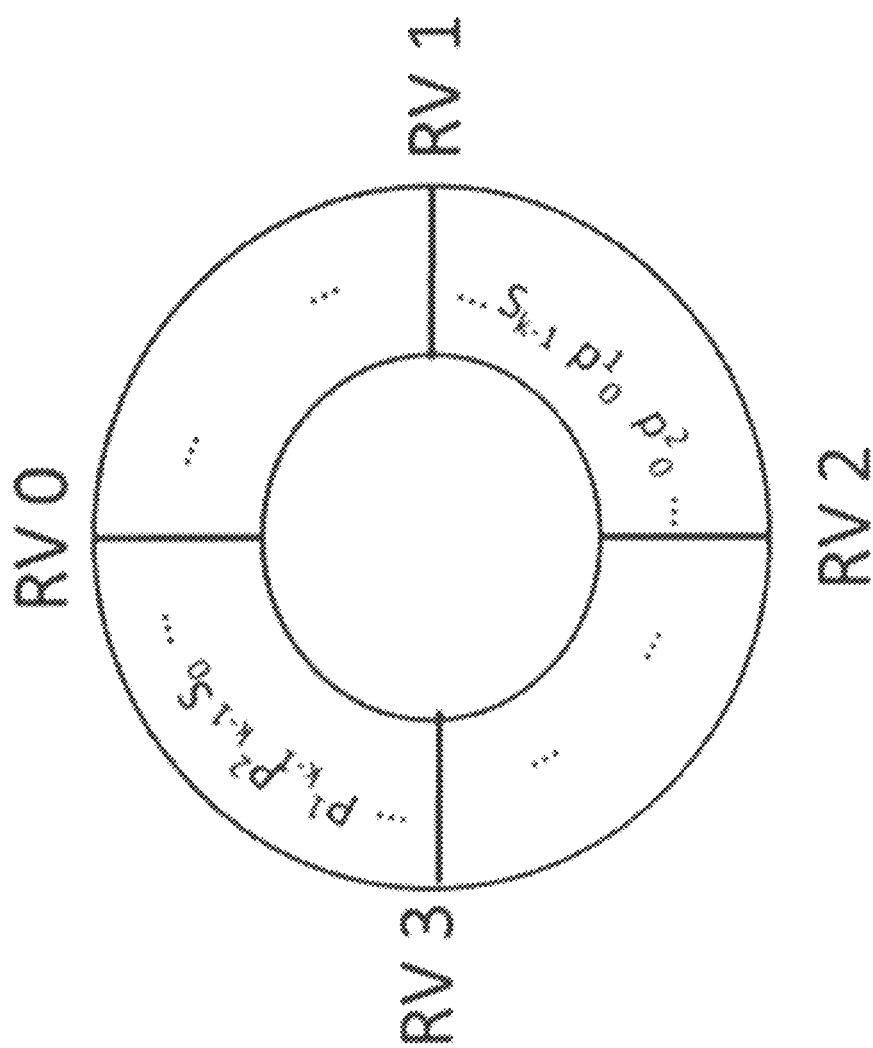
FIG. 2 illustrates an example schematic of an LTE circular buffer for rate matching.
Figure 3:
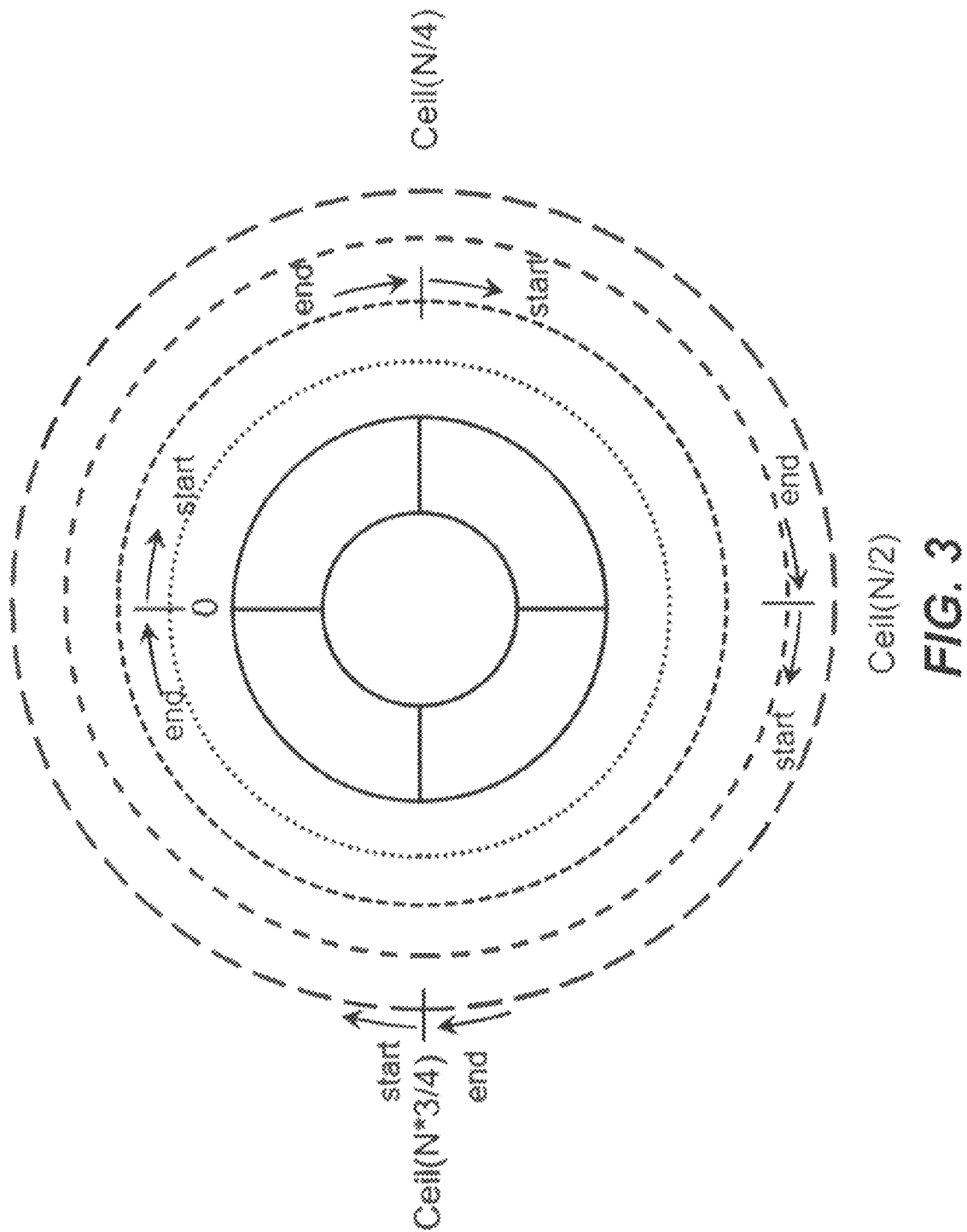
FIG. 3 illustrates an example of a circular read-out of CBs for transmission, in accordance with certain embodiments.

FIG. 3 illustrates an example of a circular read-out of CBs for transmission in which J=4, the starting CB for the first transmission is 0, the starting CB for the second transmission is $N(1) = \text{mod}(\text{ceil}(N/4*1), N) = \text{ceil}(N/4)$, etc.

EXAMPLE #1

CBG Not Configured

In the example, "J" represents the total number of possible starting points of CB indices. For purposes of example #1, J equals 4 and a TB is composed of 9 CBs: $CB_0$, $CB_1$, $CB_2$, ..., $CB_7$, $CB_8$. The 9 CBs are not divided into CBGs, or equivalently, it can be viewed that there is one CBG and the CBG size is equal to the TB size.

For the first transmission, j=0, the transmission order for the CBs in 1st transmission is according to CB indices [0 1 2 3 4 5 6 7 8].

After the first transmission (j=0), as an example, the transmitter receives NACK for the transport block. In the second transmission (j=1, $1^{st}$ retransmission), the read-out for the case where J=4 starts at CB index: ceil(N/4)=ceil(9/4)=3. The transmission order for the CBs in the 1st retransmission (i.e., 2nd transmission) is then according to CB indices [3 4 5 6 7 8 0 1 2].

After the second transmission (j=1), as an example, the transmitter receives NACK for the transport block. In the third transmission (j=2, 2nd retransmission), the read-out for the case where J=4 starts at CB index: ceil(N*2/4)=ceil(9*2/4)=5. Thus, the transmission order for the CBs in the 2nd retransmission is then according to CB indices [5 6 7 8 0 1 2 3 4].

The above general description applies to the case where all CBs in the TB belong to the same CBG. In this case, retransmissions of all CBs, with CB transmission order defined as above, take place until the TB has passed the CRC check and is assumed to be received without errors.

Let's now assume that the CBs in the TB are divided into G CBGs. Since the transmitter receives an ACK/NACK separately for each CBG, only a subset of the CBs in the TB are typically retransmitted in case of errors. Typically, the starting CB for the first transmission is 0 and thereby the transmission order for the first transmission is [0 1 ... N−1] as described above. For subsequent retransmissions, the CB indices are reordered according to algorithms (1) and (2) above. Further, during the read-out of CBs from the circular indexing shown in FIG. 3, only CBs belonging to CBGs for which the transmitter received NACK/DTX should be considered.

One way to implement this is to keep the original starting CBs, calculated by algorithm (2) above, where N is always the number of CBs originally belonging to the TB, and the CB indices are as originally assigned in initial transmission of the TB. All CBs belonging to CBGs for which ACK was received should be ignored in the read-out from the circular indexing and should not be retransmitted.

EXAMPLE #2

CBG Configured

In the example, "J" represents the total number of possible starting points of CB indices. For purposes of example #2, J equals 4 and a TB is composed of 9 CBs: $CB_0$, $CB_1$, $CB_2$, ..., $CB_6$, $CB_7$, $CB_8$. The 9 CBs are divided into 3 CBGs according to the following table:

| CBG | CBs in the CBG |
|---|---|
| $CBG_0$ | $CB_0$, $CB_1$, $CB_2$ |
| $CBG_1$ | $CB_3$, $CB_4$, $CB_5$ |
| $CBG_2$ | $CB_6$, $CB_7$, $CB_8$ |

For the first transmission, j=0, the transmission order for the CBs in 1st transmission is according to CB indices [0 1 2 3 4 5 6 7 8].

After the first transmission (j=0), as an example, the transmitter receives ACK for CBG1 and NACK for $CBG_0$ and $CBG_2$. In the second transmission (j=1, 1st retransmission), the read-out for the case where J=4 starts at CB index: ceil(N/4)=ceil(9/4)=3. Before considering that CBs in $CBG_1$ do not need to be retransmitted, the transmission order for the CBs in 1st retransmission is then [3 4 5 6 7 8 0 1 2]. After considering that CBs in CBG1 do not need to be retransmitted, the transmission order for the CBs in 1st retransmission is then [6 7 8 0 1 2], since $CB_3$, $CB_4$ and CBs of CBG1 should be excluded from retransmission.

After the second transmission (j=1), as an example, the transmitter receives ACK for $CBG_2$ and NACK for CBG0. In the third transmission (j=2, 2nd retransmission), the read-out for the case where J=4 starts at CB index: ceil(N*2/4)=ceil(9*2/4)=5. Before considering that CBs in $CBG_1$ and $CBG_2$ do not need to be retransmitted, the transmission order for the CBs in 2nd retransmission is then [5 6 7 8 0 1 2 3 4]. After considering that CBs in CBG1 and CBG2 do not need to be retransmitted, the transmission order for the CBs in 2nd retransmission is then [0 1 2], since CB of indices 3 to 8 (i.e., CBs belonging to $CBG_1$ and $CBG_2$) should be excluded.

Another way to implement the read-out of CBs from the circular indexing when some CBs should not be retransmitted is to consider only those CBs belonging to CBGs with NACK/DTX in the circular indexing. The CBs belonging to CBGs that have been ACK-ed are excluded. The number of CBs in the circular indexing for the retransmission is then $N_j$, where $N_j <= N$. Parameter $N_j$, is the total number of CBs belonging to the CBGs to be sent in j-th transmission of the transport block. The starting CBs can then be calculated as in (1) and (2), except using $N_j$ instead of N. That is, transmitting in the order of CB indices:

$$[N_j(j), N_j(j)+1, \ldots, N_j-1, 0, 1, \ldots, N_j(j)-1] \quad (3)$$

where the starting CB index is calculated as $$N_j(j) = \mathrm{mod}(\mathrm{ceil}((N_j/J)*j), N_j), \quad (4)$$

CBG as Interleaving Unit; Interleave the CBs to Transmit

In another method, the interleaving unit is a whole CB. The CB indices are lined up in permuted order, i.e., after being interleaved. For example, for each j-th transmission (or retransmission), the CBs of the given TB are interleaved by a length-N interleaving pattern Π(j), before being transmitted.

This method requires defining one or more interleaving pattern Π(j) for the CB indices. Many examples of interleaving patterns exist, for example, rectangular interleaver, triangular interleaver, etc.

In one embodiment, multiple interleaver patterns of CBs are defined, one for each j-th transmission, with some transmissions potentially reusing the same interleaver. For example, if two interleaver pattern, Π(1) and Π(2), are defined, then the CBs of the transport block can be transmitted in 3 different orders, with Π(0) being the trivial pattern of natural order, Π(0)=[0, 1, 2, ..., N−1]. Then the transmission with index j, where j=3*b+0, uses interleaving pattern Π(0); transmission with index j, where j=3*b+1, uses interleaving pattern Π(1); transmission with index j, where j=3*b+2, uses interleaving pattern Π(2). Here b is an integer, b=0, 1, .... Example #3 provides an example with multiple interleaver patterns.

EXAMPLE #3

With Multiple Interleavers, CBG Not Configured

For the purposes of example #3, a TB is composed of 6 CBs: $CB_0$, $CB_1$, $CB_2$, $CB_3$, $CB_4$, $CB_5$. For the purposes of example #3, the interleaving patterns include the following patterns:

Π(0)=[0 1 2 3 4 5]
Π(1)=[2 3 5 1 4 0]
Π(2)=[1 0 4 3 2 5]

For the initial transmission, the CBs of the TB are transmitted in their natural order: [$CB_0$, $CB_1$, $CB_2$, $CB_3$, $CB_4$, $CB_5$]. In other words, natural order Π(0) is used.

After the first transmission (j=0), as an example, the transmitter receives NACK for the transport block. For the first retransmission, the CBs of the TB are transmitted in the interleaved order according to Π(1): [$CB_2$, $CB_3$, $CB_5$, $CB_1$, $CB_4$, $CB_0$].

After the second transmission (j=1), as an example, the transmitter receives NACK for the transport block. For the second retransmission, the CBs of the TB are transmitted in the interleaved order according to Π(2): [$CB_1$, $CB_0$, $CB_4$, $CB_3$, $CB_2$, $CB_5$].

In another embodiment, one interleaver pattern is defined for the set of CB indices of a given TB. The CBs of a given TB is reordered according to the interleaving pattern. For each of j-th transmission, the transmission starts at a different index in the interleaved pattern of CBs. The starting location in the interleaved pattern is according to algorithm (1) discussed above. Example #4 provides an example with a single interleaver.

EXAMPLE #4

With a Single Interleaver, CBG Not Configured

For the purposes of example #4, a TB is composed of 6 CBs: $CB_0$, $CB_1$, $CB_2$, $CB_3$, $CB_4$, $CB_5$. One interleaving pattern is defined, e.g., Π(1)=[2 3 5 1 4 0].

For the initial transmission, the CBs of the TB are transmitted in interleaved order according to Π(1): [$CB_2$, $CB_3$, $CB_5$, $CB_1$, $CB_4$, $CB_0$].

After the first transmission (j=0), as an example, the transmitter receives NACK for the transport block. In the second transmission (j=1, 1st retransmission), the read-out for the case where J=4 starts at location #2 in the interleaved pattern: ceil(N/4)=ceil(6/4)=2. The transmission order for the CBs in 1st retransmission (i.e., 2nd transmission) is then according to CB indices [5 1 4 0 2 3], since CB index 5 is in the location #2 of the interleaving pattern Π(1).

After the second transmission (j=2), as an example, the transmitter receives NACK for the transport block. In the third transmission (j=3, 2nd retransmission), the read-out for the case where J=4 starts at location #3 in the interleaved pattern: ceil(N*2/4)=ceil(6*2/4)=3. The transmission order for the CBs in the 3rd transmission is then according to CB indices [1 4 0 2 3 5], since CB index 1 is in the location #3 of the interleaving pattern Π(1).

The above general description applies to the case where all CBs in the TB belongs to the same CBG. In this case, retransmissions of all CBs, with CB transmission order defined as above, take place until the TB has passed the CRC check and is assumed to be received without errors.

In the case of more than one CBG for the CBs in the TB, the CBs belonging to CBGs for which the transmitter received a NACK/DTX should be omitted from the interleaved pattern or possibly removed from the interleaved order after interleaving but before transmission. The procedure is similar to how successfully received CBs are excluded from retransmission when circularly selecting the CBs to transmit without interleaving.

Signaling

In the most straightforward manner, the total number of possible CB starting points J can be configured, and the index of (re-)transmission j is explicitly signaled.

However, it is preferable if signaling overhead is minimized. Hence, Parameter J can be predefined so that no signaling is necessary. In one embodiment, J is assigned the same value as the number of redundancy versions (RVs) for LDPC HARQ retransmission. For NR, this means J=4.

To remove signaling overhead of variable j, it can be given the same value as another variable used in HARQ (re-)transmission. In one embodiment, variable j is assigned the same value as RV index for the given transmission. The RV index is typically signaled as part of DCI (downlink control information), and for some special cases, the RV index takes value from a sequence of predefined RV.

CBG as Interleaving Unit

The methods described above may also be implemented using the whole CBG as the interleaving unit. This is viable if a TB is composed of numerous CBGs. Similar to the operations on the CBs, the same methods can be applied when CBG is an interleaving unit. For example: 1. The CBG indices are lined up sequentially in natural order, without being interleaved. Line up the code block groups of a given TB in a circle. For each j-th transmission, the transmission starts with a potentially different CBG index, N(j)-th CBG. 2. The CBG indices are lined up in permuted order, i.e., after being interleaved.
  a. In one embodiment, multiple interleaver patterns of CBGs are defined, one for each of j-th transmission, with some transmissions potentially reuse the same interleaver.
  b. In another embodiment, one interleaver pattern is defined for the set of CBG indices of a given TB. The CBGs of a given TB is reordered according to the interleaving pattern. For each of j-th transmission, the transmission starts at a different index in the interleaved pattern of CBGs.

Example Network

In certain embodiments, the solutions discussed herein may be performed by a wireless transmitter. In certain embodiments, the wireless transmitter may be implemented in a wireless device 305 or a network node (e.g., transmission point 320). Examples of wireless device 305 and network node (e.g., transmission point 320) are further discussed below.

Figure 4:
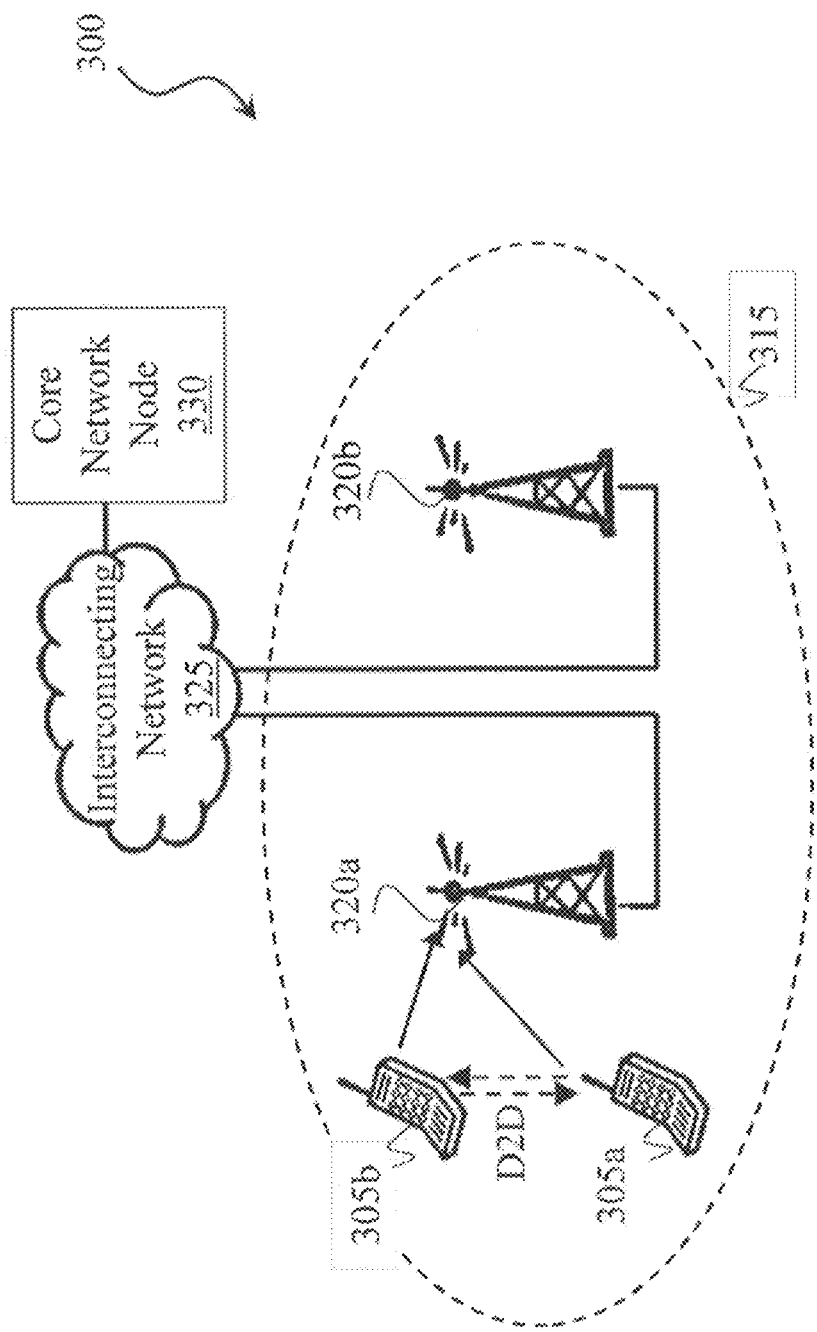
FIG. 4 is a block diagram illustrating an example of a wireless network, in accordance with certain embodiments.

FIG. 4 illustrates an example of a wireless network 300 that may be used for wireless communications. Wireless network 300 includes a plurality of radio nodes. Examples of radio nodes include wireless devices 305a-305b (such as a UE) and transmission points 320a-320b (such as a gNB, eNB, or base station). The transmission points 320 connect to one or more core network nodes 330 via an interconnecting network 325. Wireless devices 305 within coverage area 315 may each be capable of communicating directly with transmission points 320 over a wireless interface. Wireless devices may also be capable of communicating with each other via device-to-device (D2D) communication.

As an example, wireless device 305a may communicate with transmission point 320a over a wireless interface. That is, wireless device 305a may transmit wireless signals and/or receive wireless signals from transmission point 320a. The wireless signals may contain voice traffic, data traffic, control signals, and/or any other suitable information. In some embodiments, an area of wireless signal coverage associated with a transmission point 320 may be referred to as a cell.

In some embodiments wireless device 305 may be interchangeably referred to by the non-limiting term user equipment (UE). Wireless device 305 refers to any type of wireless device communicating with a network node and/or with another wireless device in a cellular or mobile communication system. Examples of wireless devices include target device, device to device (D2D) UE, V2x UE, machine type UE or UE capable of machine to machine (M2M) communication, PDA, PAD, Tablet, mobile terminals, smart phone, laptop embedded equipped (LEE), laptop mounted equipment (LME), USB dongles, etc. Thus, although FIG. 4 illustrates wireless devices 305 as phones, other embodiments may use other types of wireless devices 305. Example embodiments of wireless device 305 are described in more detail below with respect to FIGS. 5-6.

In some embodiments transmission point 320 may be interchangeably referred to by the non-limiting terms radio access node, gNB, eNB, base station, network node, or WAN node. The WAN node can be a UE (e.g., D2D UE) or a network node (e.g., access point, base station, cellular node, etc.). Example embodiments of transmission point 320 are described in more detail below with respect to FIGS. 7-8.

In certain embodiments, transmission points 320 may interface with a radio network controller. The radio network controller may control transmission points 320 and may provide certain radio resource management functions, mobility management functions, and/or other suitable functions. In certain embodiments, the functions of the radio network controller may be included in transmission point 320. The radio network controller may interface with a core network node 330. In certain embodiments, the radio network controller may interface with the core network node 330 via an interconnecting network 325.

The interconnecting network 325 may refer to any interconnecting system capable of transmitting audio, video, signals, data, messages, or any combination of the preceding. The interconnecting network 325 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 330 may manage the establishment of communication sessions and various other functionalities for wireless devices 305. Wireless devices 305 may exchange certain signals with the core network node using the non-access stratum layer. In non-access stratum signaling, signals between wireless devices 305 and the core network node 330 may be transparently passed through the radio access network. In certain embodiments, transmission points 320 may interface with one or more network nodes over an internode interface. For example, transmission points 320*a* and 320*b* may interface over an internode interface.

Although FIG. 4 illustrates a particular arrangement of network 300, the present disclosure contemplates that the various embodiments described herein may be applied to a variety of networks having any suitable configuration. For example, network 300 may include any suitable number of wireless devices 305 and transmission points 320, as well as any additional elements suitable to support communication between wireless devices or between a wireless device and another communication device (such as a landline telephone). The embodiments may be implemented in any appropriate type of telecommunication system supporting any suitable communication standards and using any suitable components and are applicable to any radio access technology (RAT) or multi-RAT systems in which the wireless device receives and/or transmits signals (e.g., data). While some embodiments are described for a particular RAT for the purposes of example and explanation, other embodiments are applicable to any suitable RAT, which may include LTE, LTE FDD/TDD, NR, WCDMA/HSPA, GSM/GERAN, Wi Fi, WLAN, CDMA2000, etc.

Figure 5:
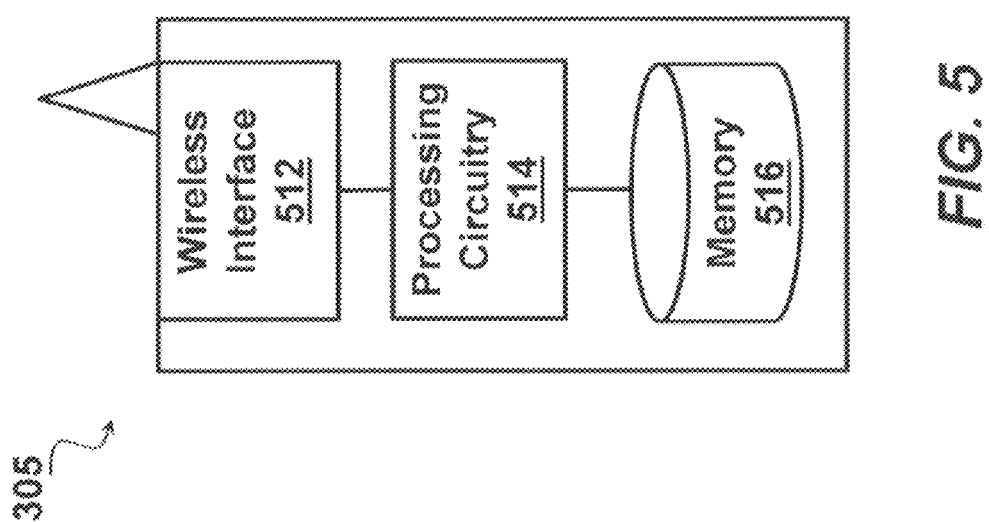
FIG. 5 is a block diagram illustrating an example of a wireless device, in accordance with certain embodiments.

FIG. 5 is a block diagram of an exemplary wireless device 305, in accordance with certain embodiments. Wireless device 305 includes one or more each of a wireless interface 512, processing circuitry 514 (e.g., comprising one or more processors), and memory 516. In some embodiments, wireless interface 512 includes a transmitter (wireless transmitter) and a receiver (wireless receiver) that facilitates transmitting wireless signals to and receiving wireless signals from network node/WAN node/transmission point 320 (e.g., via an antenna), processing circuitry 514 executes instructions to provide some or all of the functionality described herein as being provided by a wireless device (or UE) (including the functionality associated with a wireless transmitter included in the wireless device), and memory 516 stores the instructions executed by processing circuitry 514.

Processing circuitry 514 may include any suitable combination of hardware and software implemented in one or more modules to execute instructions and manipulate data to perform some or all of the described functions of a wireless transmitter, UE, or wireless device 305, such sending a transmission comprising code blocks arranged according to a first order, rearranging the code blocks into a second/different order, and sending a retransmission comprising at least some of the code blocks arranged according to the second order. In certain embodiments, processing circuitry 514 may include some or all of the components discussed with reference to FIG. 6 herein. In certain embodiments, processing circuitry 514 may perform some or all of the methods described above with respect to the headings "CBG as interleaving unit; Circularly select the CBs to transmit without interleaving," "CBG as interleaving unit; Interleave the CBs to transmit," "Signaling," and "CBG as interleaving unit" and below with respect to FIGS. 9-10. In some embodiments, processing circuitry 514 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 516 is generally operable to store instructions, such as a computer program, software, an application including one or more of logic, rules, algorithms, code, tables, etc. and/or other instructions capable of being executed by processing circuitry 514. Examples of memory 516 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 514 of wireless device 305.

Other embodiments of wireless device 305 may include additional components beyond those shown in FIG. 5 that may be responsible for providing certain aspects of the wireless device's functionality, including any of the functionality described herein and/or any additional functionality (including any functionality necessary to support the solution described herein). As just one example, wireless device 305 may include input devices and circuits, output devices, and one or more synchronization units or circuits, which may be part of the processing circuitry. Input devices include mechanisms for entry of data into wireless device 305. For example, input devices may include input mechanisms, such as a microphone, input elements, a display, etc. Output devices may include mechanisms for outputting data in audio, video and/or hard copy format. For example, output devices may include a speaker, a display, etc.

Figure 6:
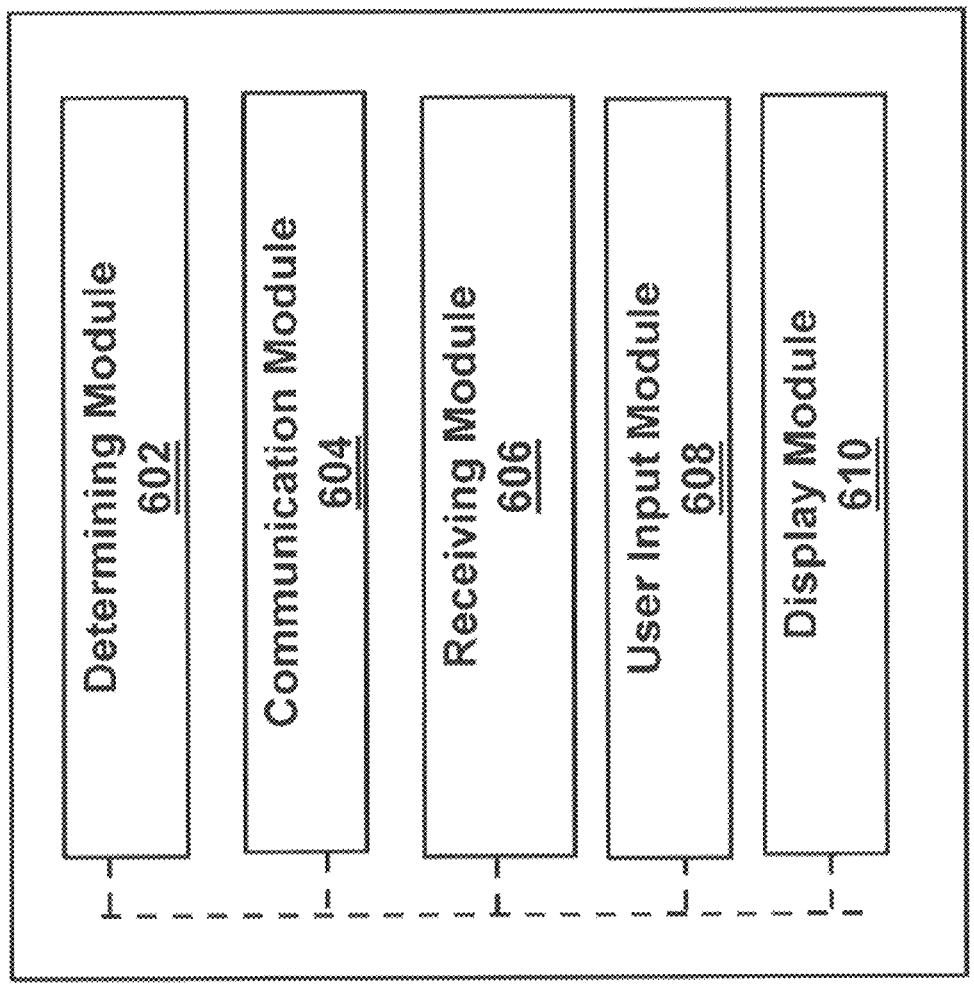
FIG. 6 is a block diagram illustrating an example of components of a wireless device, in accordance with certain embodiments.

FIG. 6 illustrates examples of modules that can be included in wireless device 305. In certain embodiments, wireless device 305 may include any one or more of determining module(s) 602, communication module(s) 604, receiving module(s) 606, user input module(s) 608, display module(s) 610, and/or other suitable modules. The functionality of the modules may be integrated in a single component or separated among several components in any suitable manner. In certain embodiments, one or more of the modules may be implemented using processing circuitry 514 described with respect to FIG. 5.

The determining module 602 may perform the processing functions of wireless device 305 (including any of the wireless device functionality to support the embodiments described herein, such as the wireless transmitter functionality described above with respect to the headings "CBG as interleaving unit; Circularly select the CBs to transmit without interleaving," "CBG as interleaving unit; Interleave the CBs to transmit," "Signaling," and "CBG as interleaving unit" and below with respect to FIGS. 9-10). As one example, the determining module 602 may determine an order for arranging code blocks in a transmission and may determine a different order for arranging at least some of the code blocks in a retransmission (e.g., in response to a NACK/DTX).

The determining module 602 may include or be included in processing circuitry 514 described above in relation to FIG. 5. The determining module 602 may include analog and/or digital circuitry configured to perform any of the functions of the determining module 602 and/or processing circuitry described above. The functions of the determining module 602 described above may, in certain embodiments, be performed in one or more distinct modules.

The communication module 604 may perform the transmission functions of wireless device 305. For example, in certain embodiments the communication module 604 may communicate uplink transmissions and retransmissions to transmission point 320. The communication module 604 may include a transmitter and/or a wireless interface, such as wireless interface 512 described above in relation to FIG. 5. The communication module 604 may include circuitry configured to wirelessly transmit messages and/or signals. In particular embodiments, the communication module 604 may receive messages and/or signals for transmission from the determining module 602. In certain embodiments, the functions of the communication module 604 described above may be performed in one or more distinct modules.

The receiving module 606 may perform the receiving functions of wireless device 305. For example, the receiving module 606 may receive a NACK from transmission point 320. The receiving module 606 may include a receiver and/or a wireless interface, such as wireless interface 512 described above in relation to FIG. 5. The receiving module 606 may include circuitry configured to wirelessly receive messages and/or signals. In certain embodiments, the receiving module 606 may include circuitry (which may comprise one or more interfaces) configured to receive information from other circuitry within wireless device 305. As an example, processing circuitry 514 may use internal interface(s) to receive information from memory 516 of wireless device 305. As another example, a higher layer process of wireless device 305 may be configured to receive signals from a lower layer process of wireless device 305 via one or more internal interfaces. In particular embodiments, the receiving module 606 may communicate received messages and/or signals to the determining module 602. The functions of the receiving module 606 described above may, in certain embodiments, be performed in one or more distinct modules.

In certain embodiments, wireless device 305 may optionally include a user input module 608 that may receive user input intended for wireless device 305. For example, the user input module 608 may receive key presses, button presses, touches, swipes, audio signals, video signals, and/or any other appropriate signals. The user input module 608 may include one or more keys, buttons, levers, switches, touchscreens, microphones, and/or cameras. The user input module 608 may communicate received signals to the determining module 602. The functions of the user input module 608 described above may, in certain embodiments, be performed in one or more distinct modules.

In certain embodiments, wireless device 305 may optionally include a display module 610, which may present signals on a display of wireless device 305. The display module 610 may include the display and/or any appropriate circuitry and hardware configured to present signals on the display. The display module 610 may receive signals to present on the display from the determining module 602. The functions of the display module 610 described above may, in certain embodiments, be performed in one or more distinct modules.

Each module depicted in FIG. 6 may include any suitable configuration of hardware and/or software. Wireless device 305 may include additional modules beyond those shown in FIG. 6 that may be responsible for providing any suitable functionality, including any of the functionality described above and/or any additional functionality (including any functionality necessary to support the various solutions described herein).

In certain embodiments, some or all of the modules shown in FIG. 6 can be combined with one or more modules shown in FIG. 5. As an example, certain embodiments may combine at least some of the functionality of the processing circuitry (FIG. 5) with the determining module 602 (FIG. 6). As another example, certain embodiments may combine at least some of the functionality of the wireless interface (FIG. 5) with the communication and/or receiving modules 606 (FIG. 6).

Although the preceding description has discussed wireless device 305 in terms of its ability to send transmissions to transmission point 320, wireless device 305 may also be operable to receive transmissions from transmission point 320. For example, wireless device 305 may receive a transmission from transmission point 320 at the receiving module 606, wireless device 305 may respond with a NACK indicating code blocks/code block groups that wireless device 305 could not successfully receive (e.g., the NACK may be sent using the communication module 604), and wireless device 305 may receive a retransmission of at least some of the code blocks at the receiving module 606 (wherein the retransmission arranges the code blocks in a different order than the original transmission).

Figure 7:
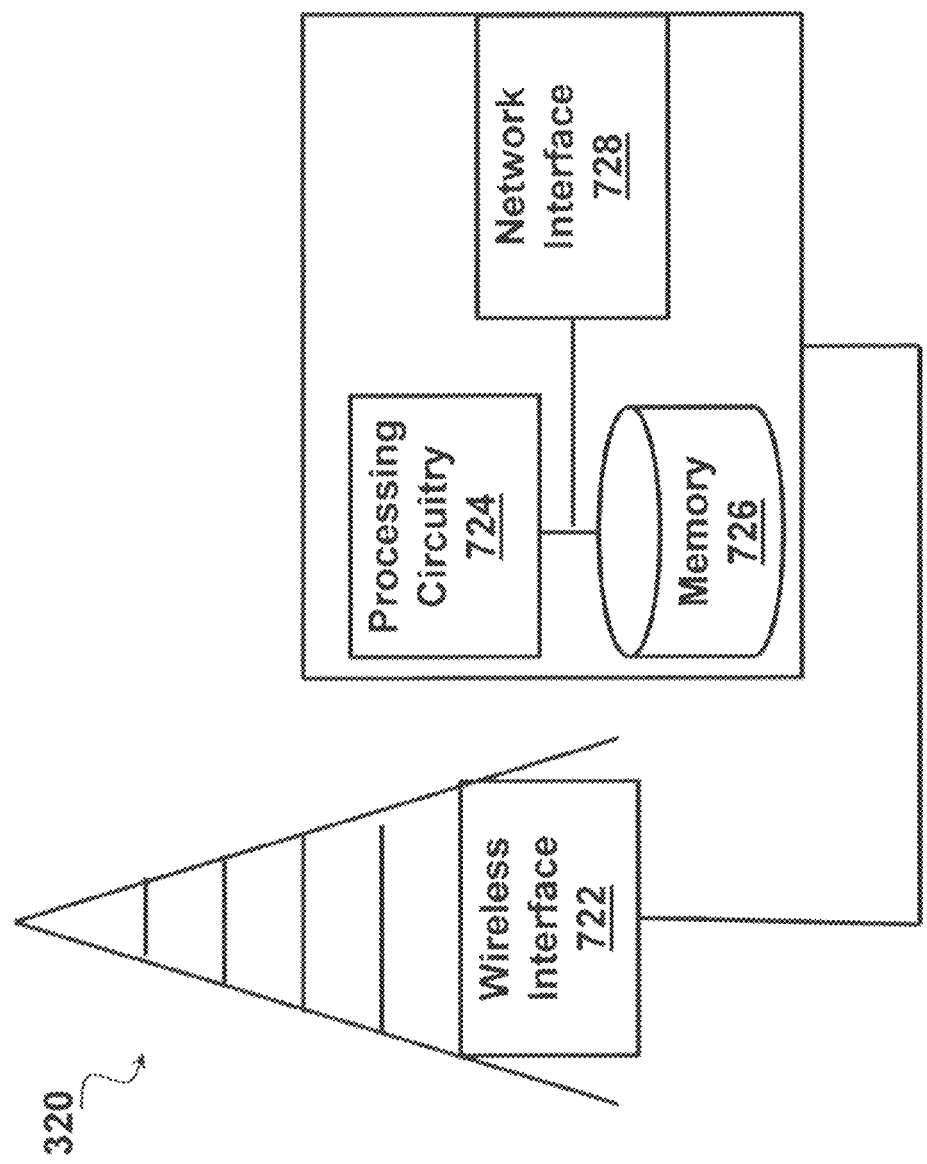
FIG. 7 is a block diagram illustrating an example of a network node, in accordance with certain embodiments.

FIG. 7 is a block diagram of an exemplary network node, such as transmission point 320, in accordance with certain embodiments. Transmission point 320 may include one or more of wireless interface(s) 722, processing circuitry 724 (e.g., comprising one or more processors), memory (or memories) 726, and/or network interface(s) 728. In some embodiments, wireless interface 722 comprises a transmitter (wireless transmitter) and a receiver (wireless receiver) that facilitate transmitting wireless signals to receiving wireless signals from wireless device 305 (e.g., via an antenna), processing circuitry 724 executes instructions to provide some or all of the functionality described herein as being provided by a transmission point 320 (including functionality of a wireless transmitter within transmission point 320), memory 726 stores the instructions executed by processing circuitry 724, and network interface 728 communicates signals to backend network components, such as a gateway, switch, router, Internet, Public Switched Telephone Network (PSTN), core network nodes or radio network controllers, etc.

Processing circuitry 724 may include any suitable combination of hardware and software implemented in one or more modules to execute instructions and manipulate data to perform some or all of the described functions of a wireless transmitter, network node, or transmission point 320, such sending a transmission comprising code blocks arranged according to a first order, rearranging the code blocks into a second/different order, and sending a retransmission comprising at least some of the code blocks arranged according to the second order. In certain embodiments, processing circuitry 724 may include some or all of the components discussed with reference to FIG. 8 herein. In certain embodiments, processing circuitry 724 may perform some or all of the methods described above with respect to the headings "CBG as interleaving unit; Circularly select the CBs to transmit without interleaving," "CBG as interleaving unit; Interleave the CBs to transmit," "Signaling," and "CBG as interleaving unit" and below with respect to FIGS. 9-10. In some embodiments, processing circuitry 724 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 726 is generally operable to store instructions, such as a computer program, software, an application including one or more of logic, rules, algorithms, code, tables, etc. and/or other instructions capable of being executed by processing circuitry 724. Examples of memory 726 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 728 is communicatively coupled to processing circuitry 724, and network interface 728 may refer to any suitable device operable to receive input for transmission point 320, send output from transmission point 320, perform suitable processing of the input or output or both, communicate to other devices, or any combination of the preceding. Network interface 728 may include appropriate hardware (e.g., port, modem, network interface card, etc.) and software, including protocol conversion and data processing capabilities, to communicate through a network.

Other embodiments of transmission point 320 may include additional components beyond those shown in FIG. 7 that may be responsible for providing certain aspects of the transmission point 320's functionality, including any of the functionality described herein and/or any additional functionality (including any functionality necessary to support the solutions described herein). Core network node 330 may have comprise similar components as those shown in FIG. 7, however, a wireless interface (e.g., wireless interface 722) is optional for the core network node 330. The various different types of network nodes may include components having the same physical hardware but configured (e.g., via programming) to support different radio access technologies, or may represent partly or entirely different physical components.

Figure 8:
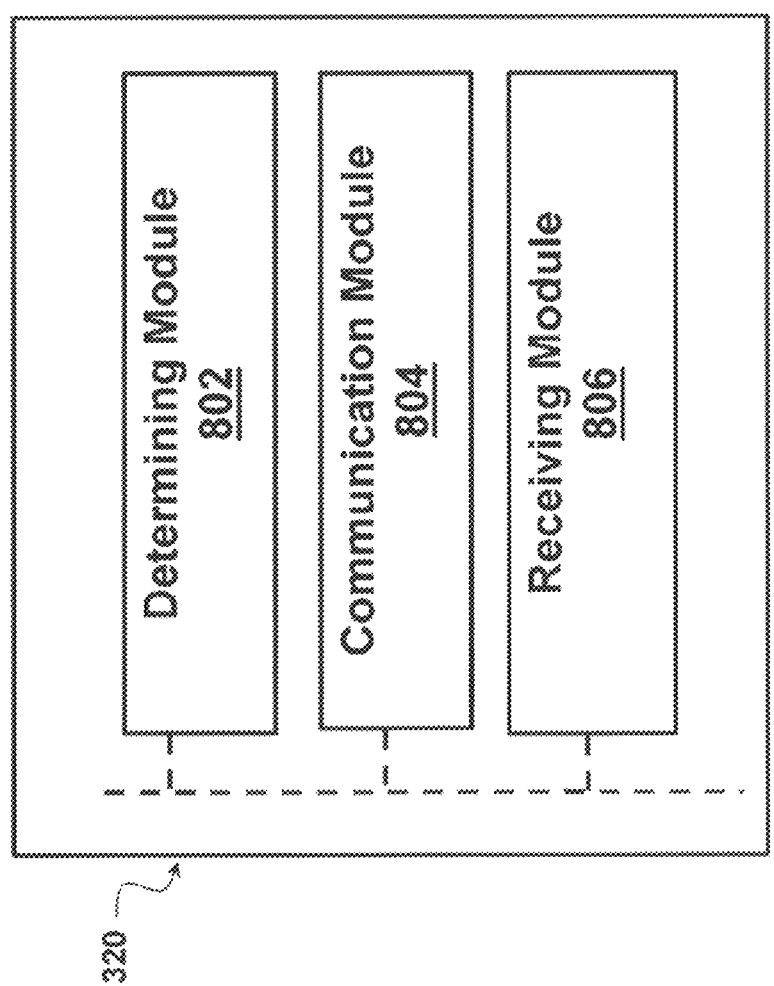
FIG. 8 is a block diagram illustrating an example of components of a network node, in accordance with certain embodiments.

FIG. 8 illustrates examples of modules that can be included in transmission point 320. In certain embodiments, transmission point 320 may include any one or more of determining module(s) 802, communication module(s) 804, receiving module(s) 806, and/or other suitable modules. The functionality of the modules may be integrated in a single component or separated among several components in any suitable manner. In certain embodiments, one or more of the modules may be implemented using processing circuitry 724 described with respect to FIG. 7.

The determining module 802 may perform the processing functions of transmission point 320 (including any of the wireless transmitter/transmission point/network node functionality to support the embodiments described herein, such as the wireless transmitter functionality described above with respect to the headings "CBG as interleaving unit; Circularly select the CBs to transmit without interleaving," "CBG as interleaving unit; Interleave the CBs to transmit," "Signaling," and "CBG as interleaving unit" and below with respect to FIGS. 9-10). For example, determining module 802 may perform determinations that facilitate reordering of code blocks for NR HARQ.

The determining module 802 may include analog and/or digital circuitry configured to perform any of the functions of the determining module 802 and/or processing circuitry 724 described above. The functions of the determining module 802 described above may, in certain embodiments, be performed in one or more distinct modules.

The communication module 804 may perform the transmission functions of transmission point 320. For example, in certain embodiments the communication module 804 may communicate downlink transmissions and retransmissions to wireless device 305. The communication module 804 may include a transmitter and/or a wireless interface, such as wireless interface 722 described above in relation to FIG. 6. The communication module 804 may include circuitry configured to wirelessly transmit messages and/or signals. In particular embodiments, the communication module 804 may receive messages and/or signals for transmission from the determining module 802. In certain embodiments, the functions of the communication module 804 described above may be performed in one or more distinct modules.

The receiving module 806 may perform the receiving functions of transmission point 320. For example, the receiving module 806 may receive a NACK from wireless device 305. The receiving module 806 may include a receiver and/or a wireless interface, such as wireless interface 722 described above in relation to FIG. 7. The receiving module 806 may include circuitry configured to wirelessly receive messages and/or signals. In certain embodiments, the receiving module 806 may include circuitry (which may comprise one or more interfaces) configured to receive information from other circuitry within transmission point 320. As an example, processing circuitry 724 may use internal interface(s) to receive information from memory 726 of transmission point 320. As another example, a higher layer process of transmission point 320 may be configured to receive signals from a lower layer process of transmission point 320 via one or more internal interfaces. In particular embodiments, the receiving module 806 may communicate received messages and/or signals to the determining module 802. The functions of the receiving module 806 described above may, in certain embodiments, be performed in one or more distinct modules.

In certain embodiments, some or all of the modules shown in FIG. 8 can be combined with one or more modules shown in FIG. 7. As an example, certain embodiments may combine at least some of the functionality of the processing circuitry (FIG. 7) with the determining module 802 (FIG. 8).

Although the preceding description has discussed transmission point 320 in terms of its ability to send transmissions to wireless device 305, transmission point 320 may also be operable to receive transmissions from wireless device 305. For example, transmission point 320 may receive a transmission from transmission point 320 at the receiving module 806, transmission point 320 may respond with a NACK indicating code blocks/code block groups that transmission point 320 could not successfully receive (e.g., the NACK can be sent by the communication module 804), and transmission point 320 may receive a retransmission of at least some of the code blocks at the receiving module 806 (wherein the retransmission arranges the code blocks in a different order than the original transmission).

Figure 9:
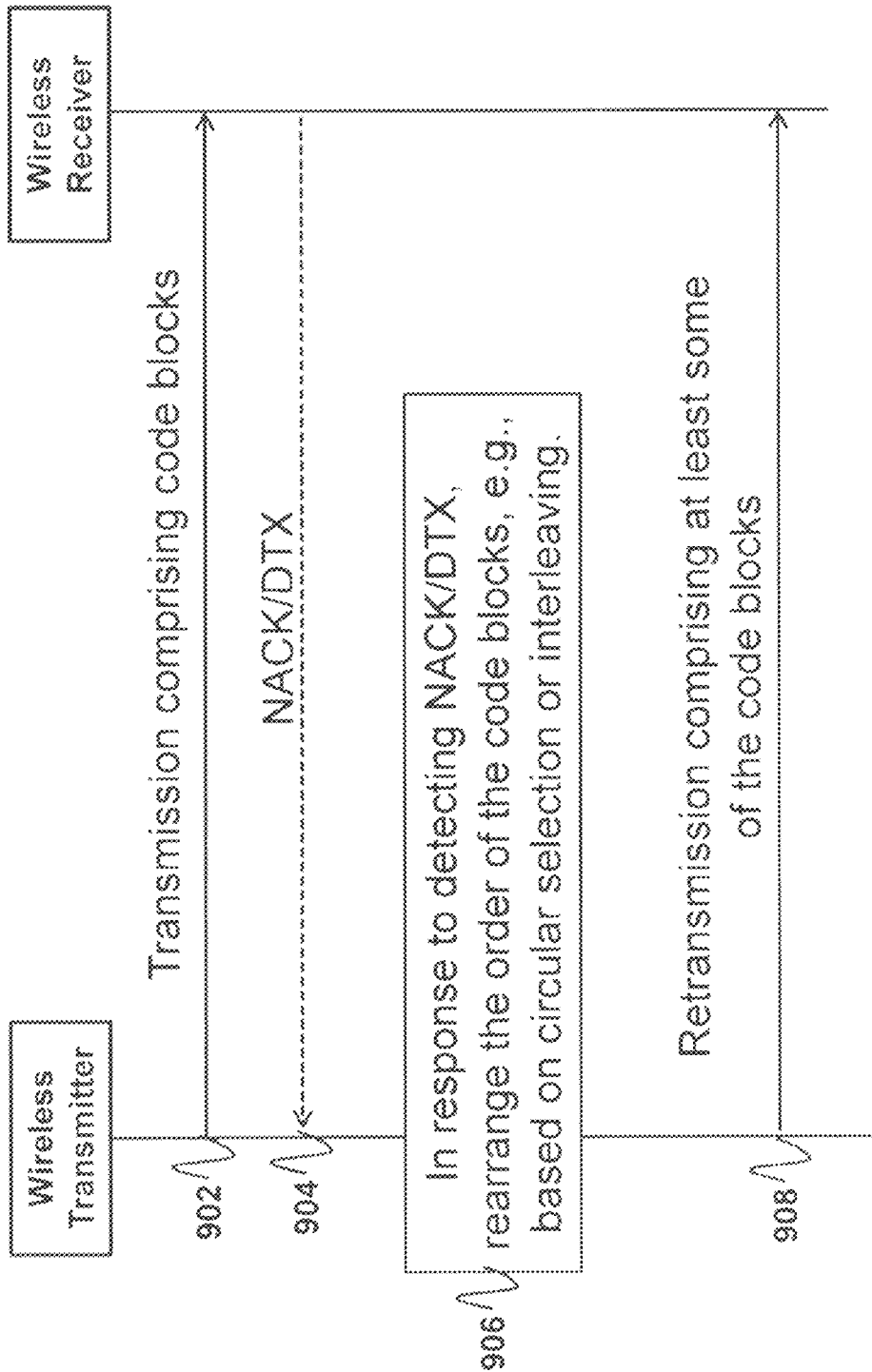
FIG. 9 is a signal diagram illustrating an example of messages that may be exchanged between a wireless transmitter and a wireless receiver, in accordance with certain embodiments.

FIG. 9 illustrates an example of a signal flow diagram between a wireless transmitter and a wireless receiver. Examples of the steps of FIG. 9 are summarized in the following example embodiments:

1. A method for use in a wireless transmitter (305 or 320), the method comprising:
sending (step 902) a transmission comprising a plurality of code blocks; and
in response to detecting a NACK/DTX indicating that a wireless receiver failed to successfully receive one or more of the code blocks (step 904), sending a retransmission of at least some of the code blocks (step 908);
wherein sending the retransmission comprises rearranging the order of the code blocks (step 906) such that the order of the code blocks in the retransmission differs from the order of the code blocks in the transmission.

2. The method of example embodiment 1, wherein the retransmission comprises all of the code blocks that were sent in the transmission.

3. The method of example embodiment 1, wherein the retransmission comprises only the code blocks associated with the NACK/DTX.

3b. The method of example embodiment 3, wherein a code block is associated with the NACK/DTX if that code block belongs to a code block group corresponding to the NACK/DTX.

4. The method of example embodiment 1, wherein rearranging the order of the code blocks comprises circularly selecting the code blocks to transmit without interleaving.

5. The method of example embodiment 4, wherein the code blocks are grouped according to code block groups and the circular selection is performed based on the code block groups.

6. The method of example embodiment 1, wherein rearranging the order of the code blocks comprises interleaving the code blocks.

7. The method of example embodiment 6, wherein the code blocks are grouped according to code block groups and the interleaving is performed based on the code block groups.

8. The method of any of example embodiments 1-6, wherein the wireless transmitter is configured according to New Radio (NR) protocol.

9. A wireless transmitter comprising processing circuitry, the processing circuitry operable to perform the steps of any of examples 1-8.

10. A computer program product comprising a non-transitory computer readable medium storing computer readable program code, wherein the computer readable program code comprises program code for performing the steps of any of examples 1-8.

Figure 10:
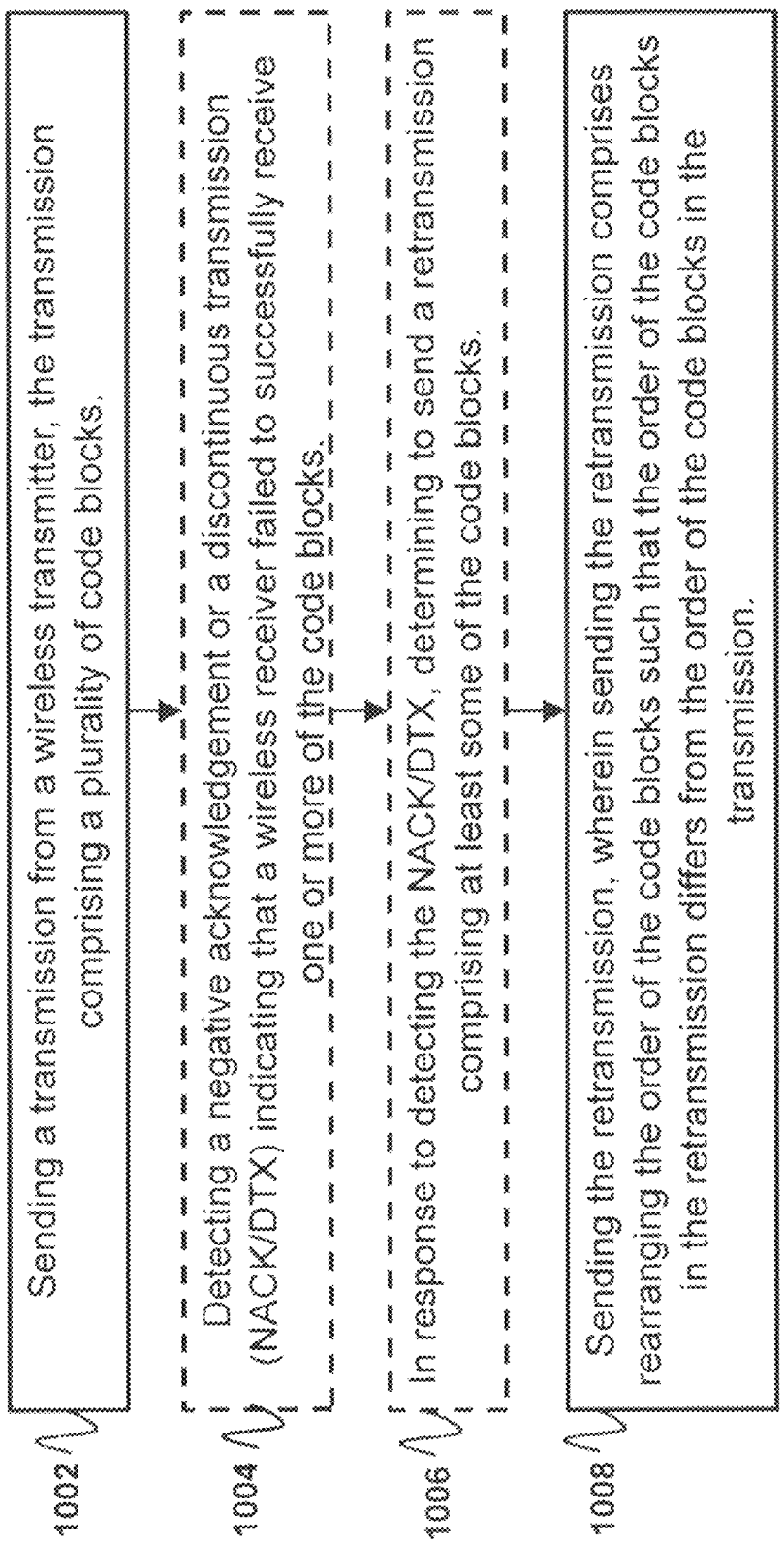
FIGS. 10 and 11 are flow charts illustrating examples of methods that may be performed by a wireless transmitter, in accordance with certain embodiments.

FIG. 10 is a flow diagram illustrating an example of a method that may be performed by a wireless transmitter, in accordance with certain embodiments. In certain embodiments, the wireless transmitter may comprise a radio network node 320 sending transmissions to a wireless device 305. In other embodiments, the wireless transmitter may comprise a wireless device 305 sending transmissions to a radio network node 320.

At step 1002, the wireless transmitter sends a transmission to a wireless receiver. The transmission comprises a plurality of code blocks. At step 1004, the wireless transmitter detects a NACK or DTX indicating that the wireless receiver failed to successfully receive one or more of the code blocks. For example, a NACK may be detected by receiving a NACK signal from a wireless receiver. A DTX may be detected based on detecting that transmissions have not been received during a certain timeframe. At step 1006, in response to detecting the NACK or DTX, the wireless transmitter determines to send a retransmission comprising at least some of the code blocks.

At step 1008, the wireless transmitter sends the retransmission. In some embodiments, the retransmission comprises all of the code block groups (thus, all of the code blocks) that were sent in the transmission. In other embodiments, each code block included in the retransmission corresponds to one of the code blocks indicated by the NACK/DTX of step 1004 (i.e., the only code blocks in the retransmission are code blocks indicated by the NACK/DTX). In other embodiments, the retransmission comprises one or more code block groups and each code block group in the retransmission includes at least one of the code blocks indicated by the NACK/DTX. As an example, suppose the transmission includes code block group A and code block group B. Suppose code block group A includes code block 1 and code block 2, and code block group B includes code block 3 and code block 4. If the NACK/DTX detected in step 1004 indicates that the wireless receiver failed to successfully receive code block 1, the wireless transmitter may retransmit code block group A (code blocks 1 and 2).

Sending the retransmission in step 1008 includes rearranging the order of the code blocks such that the order of the code blocks in the retransmission differs from the order of the code blocks in the transmission. Examples of methods for rearranging the order of the code blocks are described above with respect to the headings "CBG as interleaving unit; Circularly select the CBs to transmit without interleaving," "CBG as interleaving unit; Interleave the CBs to transmit," "Signaling," and "CBG as interleaving unit." In some embodiments, rearranging the order of the code blocks comprises circularly selecting the code blocks to transmit without interleaving. For example, the code blocks are grouped according to code block groups and the circular selection is performed based on the code block groups. In some embodiments, rearranging the order of the code blocks comprises interleaving the code blocks. For example, the code blocks are grouped according to code block groups and the interleaving is performed based on the code block groups.

Figure 11:
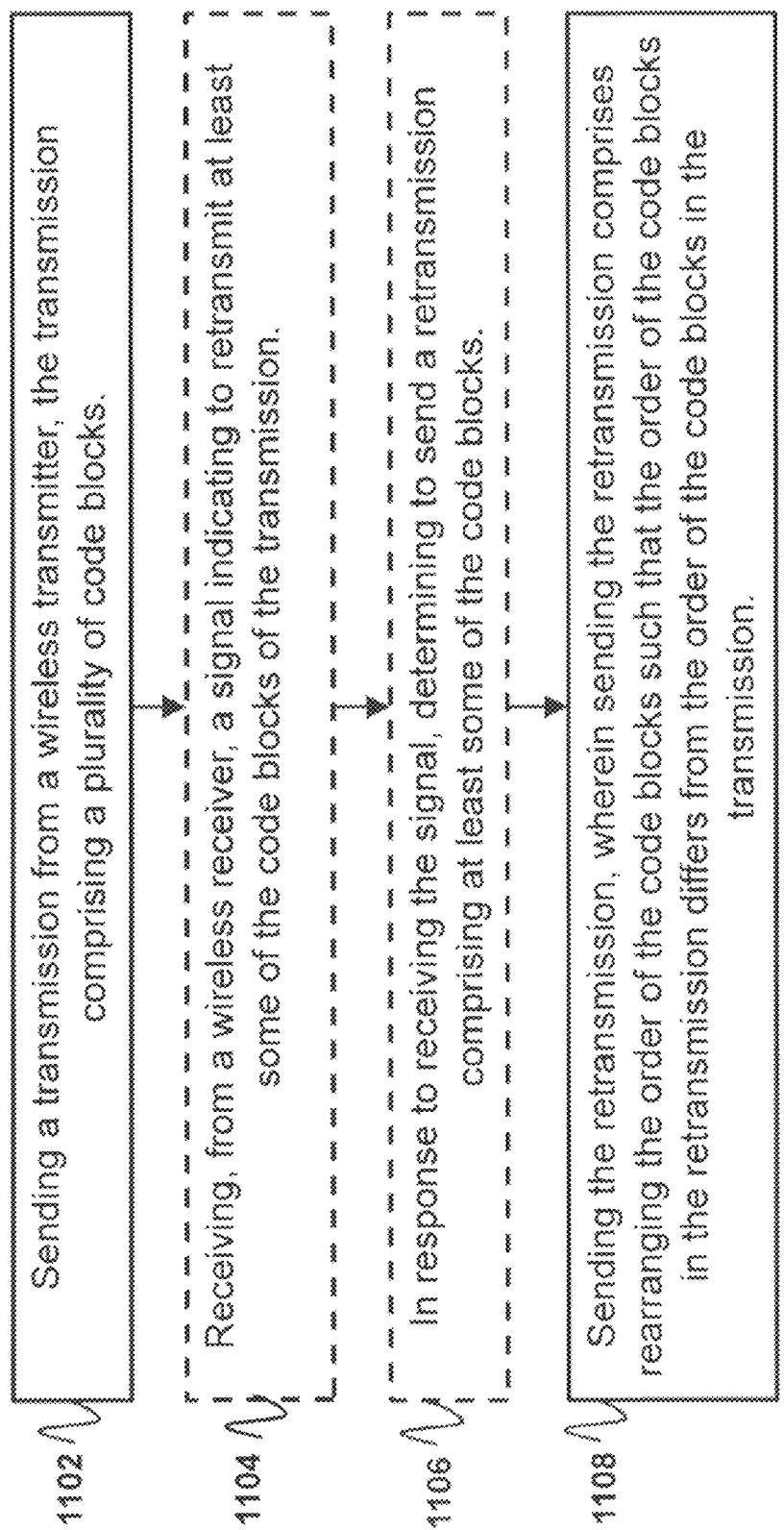

FIG. 11 is a flow diagram illustrating an example of a method that may be performed by a wireless transmitter, in accordance with certain embodiments. In certain embodiments, the wireless transmitter may comprise a radio network node 320 sending transmissions to a wireless device 305. In other embodiments, the wireless transmitter may comprise a wireless device 305 sending transmissions to a radio network node 320.

At step 1102, the wireless transmitter sends a transmission to a wireless receiver. The transmission comprises a plurality of code blocks. In certain embodiments, the wireless receiver determines that it failed to successfully receive one or more of the code blocks. The wireless receiver sends the wireless transmitter a signal indicating to retransmit at least some of the code blocks of the transmission. As an example, the wireless receiver may be a network node (e.g., gNB) and the wireless receiver may be a wireless device (e.g., UE). The network node may send the wireless device a signal, such as a request or an instruction indicating that the wireless device should retransmit at least some of the code blocks. The signal is received by the wireless transmitter in step 1104 and, in response, the wireless transmitter determines in step 1106 to send a retransmission comprising at least some of the code blocks.

At step 1108, the wireless transmitter sends the retransmission. In some embodiments, the retransmission comprises all of the code blocks that were sent in the transmission. In some embodiments, each code block included in the retransmission corresponds to one of the code blocks that the wireless receiver failed to successfully receive in the transmission (i.e., the only code blocks in the retransmission are code blocks that the wireless receiver failed to successfully receive in the transmission). In other embodiments, the retransmission comprises one or more code block groups and each code block group in the retransmission includes at least one of the code blocks that the wireless receiver failed to successfully receive in the transmission. As an example, suppose the transmission includes code block group A and code block group B. Suppose code block group A includes code block 1 and code block 2, and code block group B includes code block 3 and code block 4. If the wireless receiver successfully receives code blocks 2, 3, and 4, but fails to receive code block 1, the wireless transmitter may retransmit code block group A (code blocks 1 and 2). In some embodiments, the signal received in step 1104 may indicate which code blocks or code block groups the wireless receiver failed to successfully receive, and the wireless transmitter may use that information to determine which code blocks or code block groups to retransmit.

Sending the retransmission in step 1108 includes rearranging the order of the code blocks such that the order of the code blocks in the retransmission differs from the order of the code blocks in the transmission. Examples of methods for rearranging the order of the code blocks are described above with respect to the headings "CBG as interleaving unit; Circularly select the CBs to transmit without interleaving," "CBG as interleaving unit; Interleave the CBs to transmit," "Signaling," and "CBG as interleaving unit." In some embodiments, rearranging the order of the code blocks comprises circularly selecting the code blocks to transmit without interleaving. For example, the code blocks are grouped according to code block groups and the circular selection is performed based on the code block groups. In some embodiments, rearranging the order of the code blocks comprises interleaving the code blocks. For example, the code blocks are grouped according to code block groups and the interleaving is performed based on the code block groups.

FIG. 12 is a flow chart illustrating an example of a method that may be performed by a wireless receiver, in accordance with certain embodiments. In certain embodiments, the wireless receiver may comprise a radio network node 320 receiving transmissions from a wireless device 305. In other embodiments, the wireless receiver may comprise a wireless device 305 receiving transmissions from a radio network node 320. In general, the wireless receiver may provide functionality that supports receiving the transmissions and retransmissions described above as being sent from a wireless transmitter.

At step 1202, the wireless receiver receives at least some code blocks of a transmission that comprises a plurality of code blocks. In some embodiments, the wireless receiver determines in step 1204 that it has failed to successfully receive at least some code blocks of the transmission and, in response, sends the wireless transmitter a signal in step 1206 indicating to retransmit at least the code blocks that the wireless receiver failed to successfully receive. In other embodiments, steps 1204 and 1206 may be omitted, for example, if the wireless transmitter performs NACK/DTX detection in order to determine whether to send a retransmission. At step 1208, the wireless receiver receives at least some code blocks of a retransmission that comprises one or more of the code blocks of the transmission arranged in an order that differs from the order of the code blocks in the transmission. Examples of which code blocks are included in a retransmission and how the code blocks may be arranged in a retransmission are discussed above (see e.g., step 1008 of FIG. 10 and step 1108 of FIG. 11). If the code blocks received in step 1208 have been interleaved, the wireless receiver deinterleaves the code blocks in step 1210. At step 1212, the wireless receiver combines one or more of the code blocks received in the transmission with one or more of the code blocks received in the retransmission, and at step 1214 the wireless receiver decodes the combined code blocks.

The terminology used in this disclosure should not be seen as limiting the scope of the invention to only the aforementioned system. Other wireless systems, such as LTE, 5G/NR, WCDMA, WiMax, UMB and GSM, or future evolutions of the foregoing, may also benefit from exploiting the ideas covered within this disclosure. Terminology used in the discussion of certain radio access technologies may encompass terminology used to cover analogous features in other radio access technologies.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method for use in a wireless transmitter, the method comprising:
   sending a transmission comprising, a plurality of code blocks; and
   sending a retransmission comprising at least some of the code blocks of the transmission,
   wherein sending the retransmission comprises rearranging an order of the code blocks such that the order of the code blocks in the retransmission differs from the order of the code blocks in the transmission,
   wherein the retransmission comprises one or more code block groups, each code block group comprising a plurality of code blocks, and each code block group in the retransmission includes at least one of the code blocks that a wireless receiver failed to successfully receive in the transmission,
   wherein rearranging the order of the code blocks comprises circularly selecting the code blocks to transmit without interleaving, and
   wherein the code blocks are grouped according to code block groups and the circular selection is performed based on the code block groups.

2. The method of claim 1, further comprising:
   detecting a negative acknowledgement or a discontinuous transmission (NACK/DTX) indicating that the wireless receiver failed to successfully receive one or more of the code blocks; and
   in response to detecting the NACK/DTX, determining to send the retransmission.

3. The method of claim 1, further comprising:
receiving a signal from the wireless receiver, wherein the signal indicates to retransmit at least some of the code blocks of the transmission; and
in response to receiving the signal, determining to send the retransmission.

4. The method of claim 1, wherein the retransmission comprises all of the code blocks that were sent in the transmission.

5. The method of claim 1, wherein rearranging the order of the code blocks comprises interleaving the code blocks.

6. The method of claim 5, wherein the code blocks are grouped according to code block groups and the interleaving is performed based on the code block groups.

7. The method of claim 1, wherein the wireless transmitter is configured according to New Radio (NR) protocol.

8. A wireless transmitter, comprising:
a wireless interface; and
processing circuitry communicatively coupled to the wireless interface, the processing circuitry operable to:
send a transmission via the wireless interface, the transmission comprising a plurality of code blocks; and
send a retransmission via the wireless interface, the retransmission comprising at least some of the code blocks of the transmission, wherein to send the retransmission, the processing circuitry is further operable to rearrange an order of the code blocks such that the order of the code blocks in the retransmission differs from the order of the code blocks in the transmission,
wherein the retransmission comprises one or more code block groups, each code block group comprising a plurality of code blocks, and each code block group in the retransmission includes at least one of the code blocks that a wireless receiver failed to successfully receive in the transmission,
wherein rearranging the order of the code blocks comprises circularly selecting the code blocks to transmit without interleaving, and
wherein the code blocks are grouped according to code block groups and the circular selection is performed based on the code block groups.

9. A method for use in a wireless receiver, the method comprising:
receiving at least some code blocks of a transmission that comprises a plurality of code blocks;
receiving at least some code blocks of a retransmission that comprises one or more of the code blocks of the transmission arranged in an order that differs from the order of the code blocks in the transmission; and
combining one or more of the code blocks received in the transmission with one or more of the code blocks received in the retransmission,
wherein the retransmission comprises one or more code block groups, each code block group comprising a plurality of code blocks, and each code block group in the retransmission includes at least one of the code blocks that the wireless receiver failed to successfully receive in the transmission,
wherein the code blocks received in the retransmission are arranged according to a circular selection without interleaving, and
wherein the code blocks are grouped according to code block groups and the code blocks received in the retransmission are arranged according to a circular selection based on the code block groups.

10. The method of claim 9, wherein to enable combining of the one or more of the code blocks received in the transmission with the one or more of the code blocks received in the retransmission, the method further comprises deinterleaving the one or more of the code blocks received in the retransmission.

11. The method of claim 9, further comprising:
decoding the combined code blocks.

12. The method of claim 9, further comprising:
determining that the wireless receiver has failed to successfully receive at least some code blocks of the transmission; and
sending a signal to the wireless transmitter indicating to retransmit at least the code blocks that the wireless receiver failed to successfully receive.

13. The method of claim 9, wherein the retransmission comprises all of the code blocks that were sent in the transmission.

14. The method of claim 9, wherein the code blocks received in the retransmission are arranged with interleaving.

15. The method of claim 14, wherein the code blocks are grouped according to code block groups and the interleaving is according to the code block groups.

16. The method of claim 9, wherein the wireless receiver is configured according to New Radio (NR) protocol.

\* \* \* \* \*